United States Patent
Kung (10) Patent No.: US 8,419,019 B2
(45) Date of Patent: Apr. 16, 2013

(54) MAGNETIC FLUID SHAFT-SEALING DEVICE

(76) Inventor: Chi-Yun Kung, Kaohsiung (TW)

( * ) Notice: Subject to any disclaimer, the term of this patent is extended or adjusted under 35 U.S.C. 154(b) by 405 days.

(21) Appl. No.: 12/882,269

(22) Filed: Sep. 15, 2010

(65) Prior Publication Data

US 2012/0018958 A1    Jan. 26, 2012

(30) Foreign Application Priority Data

Jul. 23, 2010    (TW) .............................. 099124416 A (51) Int. Cl.
*F16J 15/43*    (2006.01)

(52) U.S. Cl.
USPC .......................................... 277/410; 277/629

(58) Field of Classification Search .................. 277/410, 277/629
See application file for complete search history.

(56) References Cited

U.S. PATENT DOCUMENTS

| | | | |
|---|---|---|---|
| 4,380,356 A * | 4/1983 | Weghaupt ...................... | 384/133 |
| 5,047,392 A | 9/1991 | Hed .............................. | 505/165 |
| 5,562,406 A * | 10/1996 | Ooka et al. ..................... | 415/112 |
| 5,954,342 A | 9/1999 | Mikhalev et al. .............. | 277/410 |
| 7,100,923 B2 | 9/2006 | Anzai et al. .................... | 277/410 |
| 7,188,840 B2 | 3/2007 | Li .................................. | 277/302 |
| 8,047,549 B2 * | 11/2011 | Kung ............................. | 277/410 |
| 8,328,199 B2 | 12/2012 | Oshita ........................... | 277/410 |
| 8,366,116 B2 | 2/2013 | Kung ............................. | 415/230 |
| 2003/0042684 A1 | 3/2003 | Dawson et al. ................ | 277/412 |
| 2004/0012150 A1 | 1/2004 | Anzai et al. .................... | 277/410 |

FOREIGN PATENT DOCUMENTS

| JP | 59129699 | 8/1984 |
|---|---|---|
| JP | 6097462 | 7/1985 |

* cited by examiner

*Primary Examiner* — Vishal Patel
(74) *Attorney, Agent, or Firm* — Alan Kamrath; Kamrath IP Lawfirm, P.A.

(57) ABSTRACT

A magnetic fluid shaft-sealing device includes an outer ring for receiving a rotary shaft. A magnetic-field generating unit is mounted in an annular seal chamber of the outer ring for receiving the rotary shaft. A seal ring is mounted in the seal chamber of the outer ring and located between a magnet of the magnetic-field generating unit and an end of the outer ring. The seal ring includes inner and outer peripheries spaced in a radial direction. A lip extends from the inner periphery of the seal ring toward or away from the end of the outer ring and is at a non-parallel angle to the radial direction of the seal ring to form a seal around the rotary shaft.

6 Claims, 8 Drawing Sheets

MAGNETIC FLUID SHAFT-SEALING DEVICE

BACKGROUND OF THE INVENTION

The present invention relates to a magnetic fluid shaft-sealing device and, more particularly, to a magnetic fluid shaft-sealing device with a seal ring to form a seal for a pump.

It is well known to mount a mechanical seal or a magnetic fluid seal in a pump for sealing between a pump housing of the pump and a rotary shaft in the pump housing. A typical magnetic fluid seal device generally includes a plurality of annular magnets mounted in an interior of the pump housing and around the rotary shaft or a shaft sleeve. Each magnet is sandwiched between two pole pieces also mounted around the rotary shaft. A magnetic liquid is filled in a sealing gap between an outer periphery of the rotary shaft and inner peripheries of the pole pieces. The rotary shaft and the poles pieces are made of magnetizable material. A closed magnetic circuit with magnetic force is created by flows of magnetic field lines from the magnets through the poles pieces, the rotary shaft, and the magnetic liquid and, thus, retains the magnetic liquid in the sealing gap to provide a sealing effect between the pump housing and the rotary shaft. The sealing effect of the magnetic fluid seal device mainly depends on the ability of keeping the magnetic liquid in the sealing gap. However, due to centrifugal forces generated during rotation of the rotary shaft, the pumped medium or coolant in the pump tends to infiltrate into the sealing gap between the rotary shaft and the poles pieces, and the magnetic liquid in the sealing gap tends to leak outward. Further, assembly and maintenance of the typical magnetic fluid seal are inconvenient.

Thus, a need exists for a magnetic fluid seal device that can securely retain the magnetic liquid in the sealing gap while preventing the pumped medium or coolant in the pump from infiltrating into the sealing gap.

BRIEF SUMMARY OF THE INVENTION

The present invention solves this need and other problems in the field of magnetic fluid seal devices by providing a magnetic fluid shaft-sealing device including an outer ring adapted to receive a rotary shaft. The outer ring includes first and second ends spaced along an axis and defines an annular seal chamber. The magnetic fluid shaft-sealing device further includes a magnetic-field generating unit mounted in the seal chamber of the outer ring and adapted to receive the rotary shaft. A gap is defined between the magnetic-field generating unit and the rotary shaft and adapted to be filled with a magnetic liquid. The magnetic-field generating unit includes a first magnet for creating a magnetic field providing a magnetic force to retain the magnetic liquid in the gap. The magnetic fluid shaft-sealing device further includes a first seal ring mounted in the seal chamber of the outer ring and located between the first magnet and the first end of the outer ring. The first seal ring includes inner and outer peripheries spaced in a radial direction perpendicular to the axis. The rotary shaft is adapted to extend through the first seal ring. The first seal ring further includes a lip extending from the inner periphery of the first seal ring toward or away from the first end of the outer ring and at a non-parallel angle to the radial direction of the first seal ring to form a first seal around the rotary shaft.

In a preferred form, the outer ring further includes inner and outer peripheral surfaces spaced in the radial direction. A through-hole extends from the inner peripheral surface through the outer peripheral surface. The magnetic-field generating unit further includes a hole in communication with the through-hole. The magnetic liquid is adapted to be filled in the gap through the hole and the through-hole. The magnetic-field generating unit further includes a second magnet and three pole pieces spaced along the axis. The first and second magnets and the three pole pieces are mounted in the seal chamber of the outer ring. The hole is formed in one of the pole pieces. Each pole piece includes an inner diameter smaller than an inner diameter of each magnet. A second seal ring is mounted in the seal chamber of the outer ring and located between the first magnet and the second end of the outer ring. The second seal ring includes inner and outer peripheries spaced in the radial direction. The rotary shaft is adapted to extend through the second seal ring. The second seal ring further includes a lip extending from the inner periphery of the second seal ring toward the second end of the outer ring and at a non-parallel angle to the radial direction of the second seal ring to form a second seal around the rotary shaft.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "longitudinal", "inner", "outer", "end", "portion", "section", "radial", "centrifugal", "annular", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A magnetic fluid shaft-sealing device of a first embodiment according to the preferred teachings of the present invention is shown in FIGS. 1 through 6 and generally designated 10. Magnetic fluid shaft-sealing device 10 is mounted in a seal cover 11. Magnetic fluid shaft-sealing device 10 and seal cover 11 are attached to a pump housing 12 and mounted around a rotary shaft 14 in pump housing 12 to provide a liquid seal between pump housing 12 and rotary shaft 14 (see FIG. 3). Seal cover 11 includes inner and outer end faces 20 and 22 spaced along an axis. Inner end face 20 is attached to an end 24 of pump housing 12 by screws 23. Seal cover 11 further includes a shaft hole 26 extending from inner end face 20 through outer end face 22 along the axis. Shaft hole 26 of seal cover 11 includes an annular enlarged section 28 adjacent to outer end face 22 and having a diameter greater than that of a remaining portion of shaft hole 26. A plurality of openings 32 is formed in an outer periphery 30 of seal cover 11 and in communication with enlarged section 28. A plurality of engaging slots 34 is defined in outer end face 22 of seal cover 11.

Figure 1:
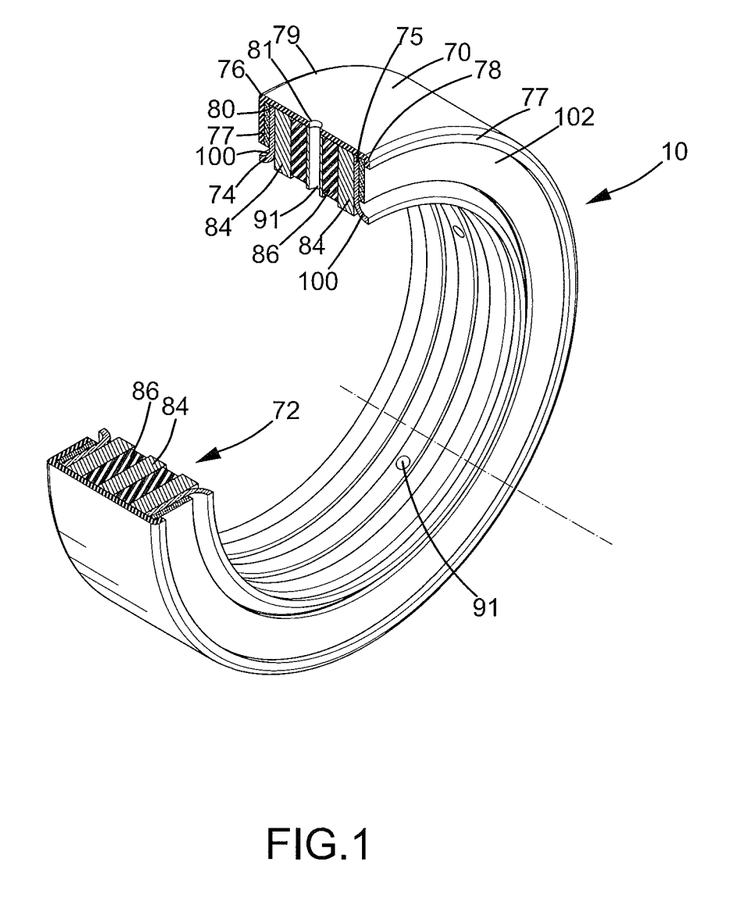
FIG. 1 shows a partly sectioned, perspective view of a magnetic fluid shaft-sealing device of a first embodiment according to the preferred teachings of the present invention.
Figure 2:
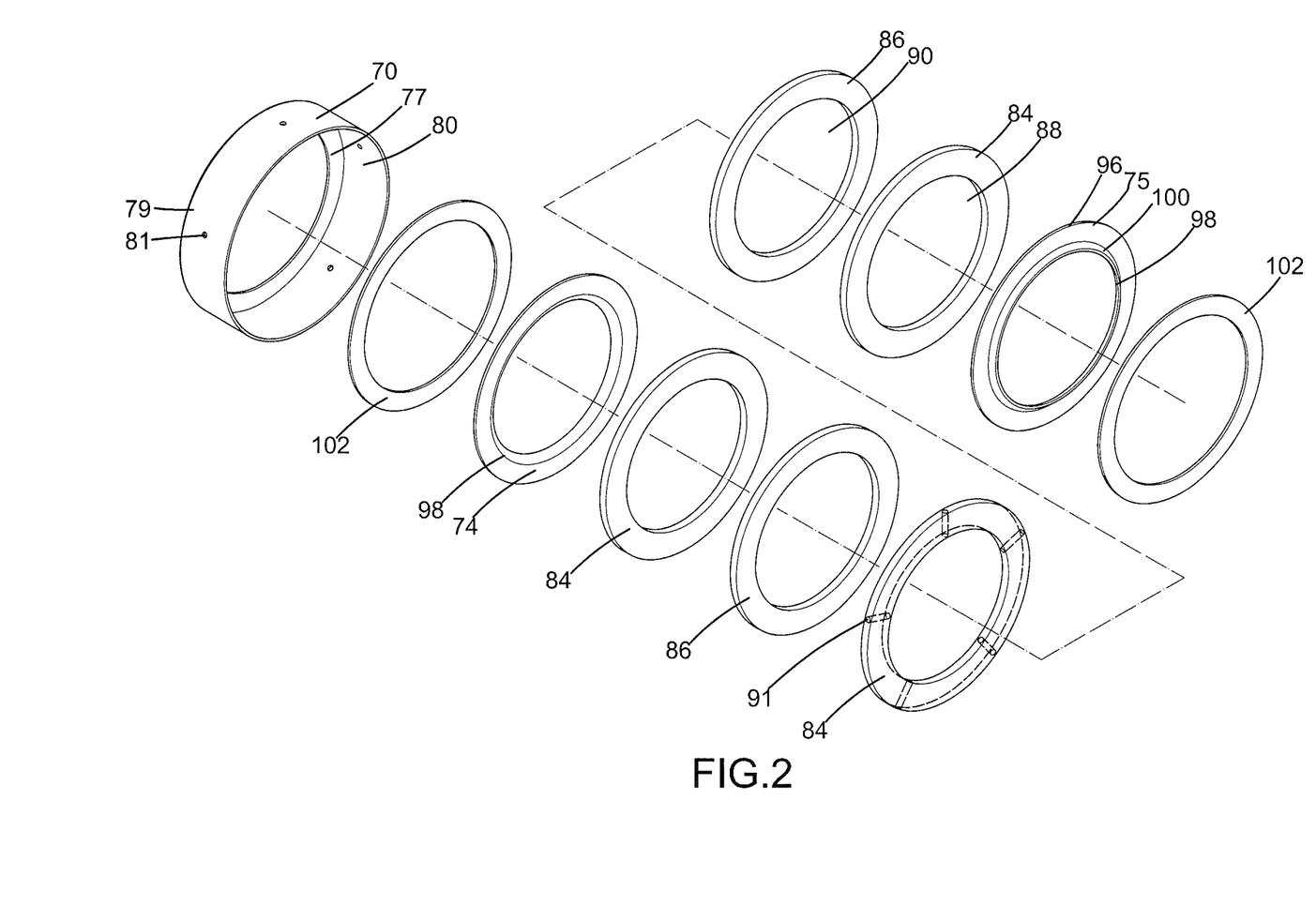
FIG. 2 shows an exploded perspective view of the magnetic fluid shaft-sealing device of FIG. 1.
Figure 3:
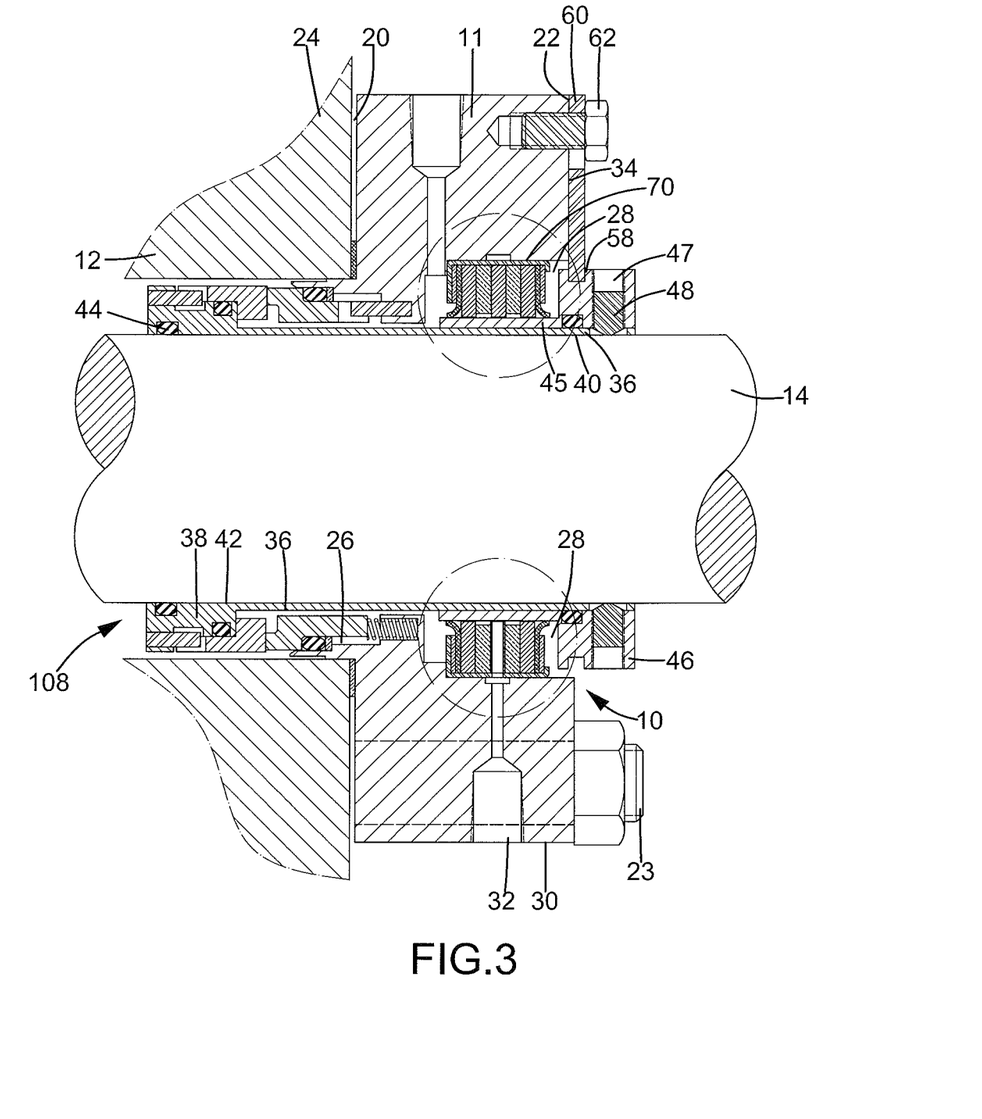
FIG. 3 shows a cross sectional view of the magnetic fluid shaft-sealing device of FIG. 1 with the magnetic fluid shaft-sealing device mounted in a seal cover which is attached to an end of a pump housing and mounted around a rotary shaft in the pump housing.
Figure 4:
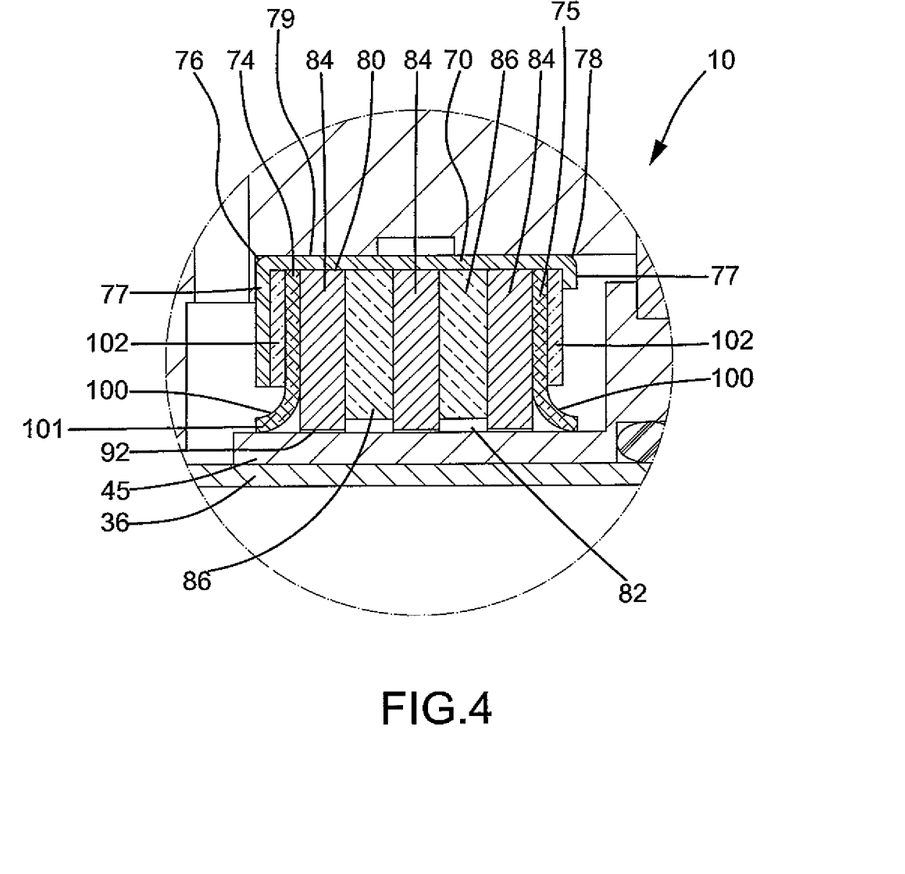
FIG. 4 shows an enlarged view of an upper circled portion of FIG. 3.
Figure 5:
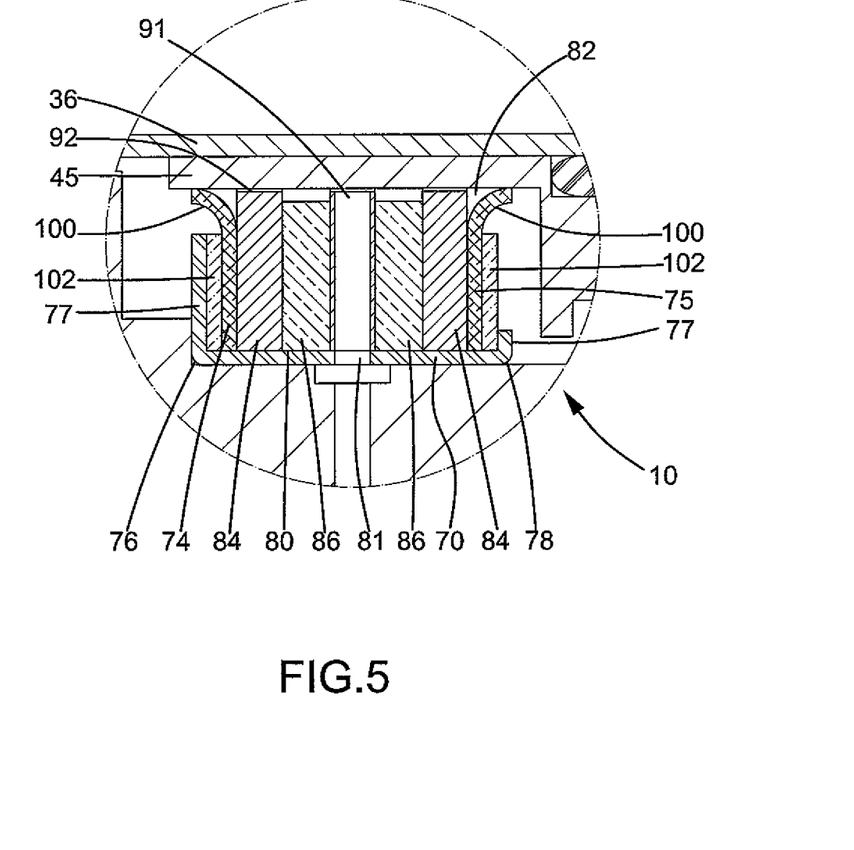
FIG. 5 shows an enlarged view of a lower circled portion of FIG. 3.
Figure 6:
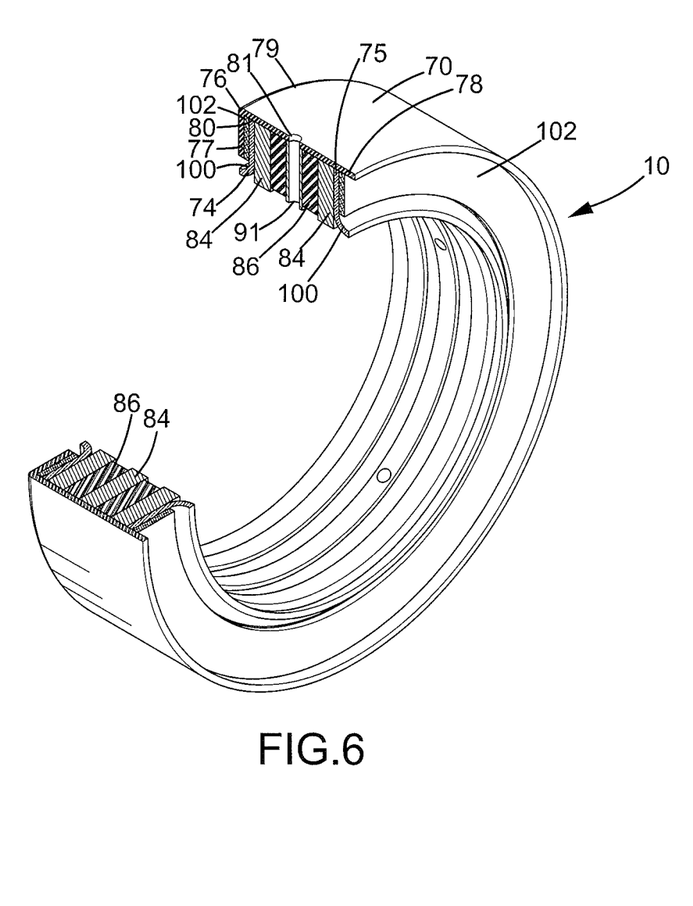
FIG. 6 shows a partly sectioned, perspective view similar to FIG. 1 with an end of an outer ring not bent.

In this embodiment, magnetic fluid shaft-sealing device 10 is mounted in enlarged section 28 of shaft hole 26 of seal cover 11 and around a shaft sleeve 36. Shaft sleeve 36 is made of magnetizable material and mounted around rotary shaft 14 to rotate therewith. Shaft sleeve 36 includes first and second sections 38 and 40 spaced along the axis. Shaft sleeve 36 further includes a longitudinal hole 42 extending from first section 38 through second section 40 and coaxial with the axis. Rotary shaft 14 extends through longitudinal hole 40 of shaft sleeve 36, and an O-ring 44 is mounted around rotary shaft 14 for sealing purposes. A portion of second section 40 of shaft sleeve 36 is received in enlarged section 28 of shaft hole 26 of seal cover 11, and a collar 45 is mounted around second section 40 of shaft sleeve 36. Collar 45 can be integrally formed with the second section 40 of shaft sleeve 36 as a single member. Collar 45 includes an inner end received in enlarged section 28 of shaft hole 26 and an outer end having a protruding annular engaging portion 46. A plurality of positioning holes 47 is defined in annular engaging portion 46 and spaced from one another in a circumferential direction. Engaging members 48 are extended through positioning holes 47 and abut against rotary shaft 14 to attach shaft sleeve 36 to rotary shaft 14. An annular groove 58 is formed in an outer periphery of collar 45 and aligned with engaging slots 34 of seal cover 11. A positioning plate 60 is received in each engaging slot 34 of seal cover 11 and engaged in annular groove 58 of collar 45. A screw 62 extends through a hole in each positioning plate 60 into seal cover 11 to prevent collar 45 from moving relative to seal cover 11 along the axis.

Magnetic fluid shaft-sealing device 10 includes an outer ring 70 adapted to receive rotary shaft 14. Outer ring 70 includes first and second ends 76 and 78 spaced along the axis. A bend 77 is formed on each of first and second ends 76 and 78 and extends inwards in a radial direction perpendicular to the axis. Outer ring 70 further includes inner and outer peripheral surfaces 80 and 79 spaced in the radial direction. A plurality of through-holes 81 extend from inner peripheral surface 80 through outer peripheral surface 79. Inner peripheral surface 80 and bends 77 of outer ring 70 together define an annular seal chamber 82.

Magnetic fluid shaft-sealing device 10 further includes a magnetic-field generating unit 72 mounted in seal chamber 82 of outer ring 70 and adapted to receive rotary shaft and collar 45. Magnetic-field generating unit 72 includes three pole pieces 84 spaced along the axis and two annular-shaped magnets 86 each including a central hole 90. Pole pieces 84 are made of magnetizable material, and each includes a central hole 88. Pole pieces 84 and magnets 86 are alternately mounted between inner peripheral surface 80 of outer ring 70 and outer periphery of collar 45 along the axis, and each magnet 86 is sandwiched between two adjacent pole pieces 8 for creating a magnetic field providing a magnetic force. Each pole piece 84 includes an inner diameter smaller than an inner diameter of each magnet 86. A gap 92 is defined between the outer periphery of collar 45 and the inner peripheries of pole pieces 84 of magnetic-field generating unit 72. Furthermore, a plurality of holes 91 is formed in one of pole pieces 84 so that a magnetic liquid (not shown) can be filled in gap 92 via openings 32 in seal cover 11, through-holes 81 in outer ring 70, and holes 91 in pole piece 84 and retained by closed magnetic circuits with the magnetic force created by magnets 86.

Magnetic fluid shaft-sealing device 10 further includes first and second seal rings 74 and 75 mounted in seal chamber 82 of outer ring 70 and located respectively between magnetic-field generating unit 72 and first and second ends 76 and 78 of outer ring 70. Each seal ring 74, 75 is made of rubber and intermediate one of bends 77 of outer ring 70 and one of pole pieces 84. Each seal ring 74, 75 includes inner and outer peripheries 98 and 96 spaced in the radial direction. Rotary shaft 14 and collar 45 are adapted to extend through each seal ring 74, 75. Each seal ring 74, 75 further includes an annular first lip 100 extending from inner periphery 98 thereof away from magnetic-field generating unit 72 and at a non-parallel angle to the radial direction. In this embodiment, first lip 100 of each seal ring 74, 75 has arcuate cross sections and a distal end 101 abutting against the outer periphery of collar 45. Further, a gasket 102 is mounted between each seal ring 74, 75 and one of bends 77 of outer ring 70 such that first and second seal rings 74 and 75 are tightly engaged in seal chamber 82 of outer ring 70.

In use, a closed magnetic circuit with magnetic force is created by flows of magnetic field lines from each magnet 86 to retain the magnetic liquid in gap 92 between collar 45 and pole pieces 84, providing a sealing effect between pump housing 12 and rotary shaft 14. Specifically, the closed magnetic circuit flows from the N pole of one of magnets 86, through pole piece 84 located at the N pole side of magnet 86, across gap 92 between pole piece 84 at the N pole side of magnet 86 and collar 45 to enter collar 45, back across gap 92 between pole piece 84 located at the S pole side of magnet 86 and collar 45, and through pole piece 84 at the S pole side of magnet 86 to the S pole of magnet 86. Furthermore, first lip 100 of seal ring 74 extends toward first end 76 of outer ring 70 and abuts the outer periphery of collar 45, and first lip 100 of seal ring 75 extends toward second end 78 of outer ring 70 and abuts the outer periphery of collar 45 so that the pumped medium or coolant outside of seal chamber 82 is not allowed to infiltrate into seal chamber 82. Namely, the pumped medium or coolant flowing through shaft hole 26 of seal cover 11 can be stopped by first lips 100 of seal rings 74 and 75 from infiltrating into seal chamber 82. Further, magnetic fluid shaft-sealing device 10 of the present invention can be assembled easily and conveniently. Specifically, second end 78 of outer ring 70 is not bent to form bend 77 at first. Second end 78 of outer ring 70 is bent after pole pieces 84, magnets 86, seal rings 74, 75, and gasket 102 are mounted into outer ring 70 (see FIG. 6), allowing convenient and tight assembly. First section 38 of shaft sleeve 36 extends out of inner end face 20 of seal cover 11, and a mechanical seal 108 is mounted around first section 40 of shaft sleeve 36 to provide further sealing between pump housing 12 and rotary shaft 14 (FIG. 3).

Figure 7:
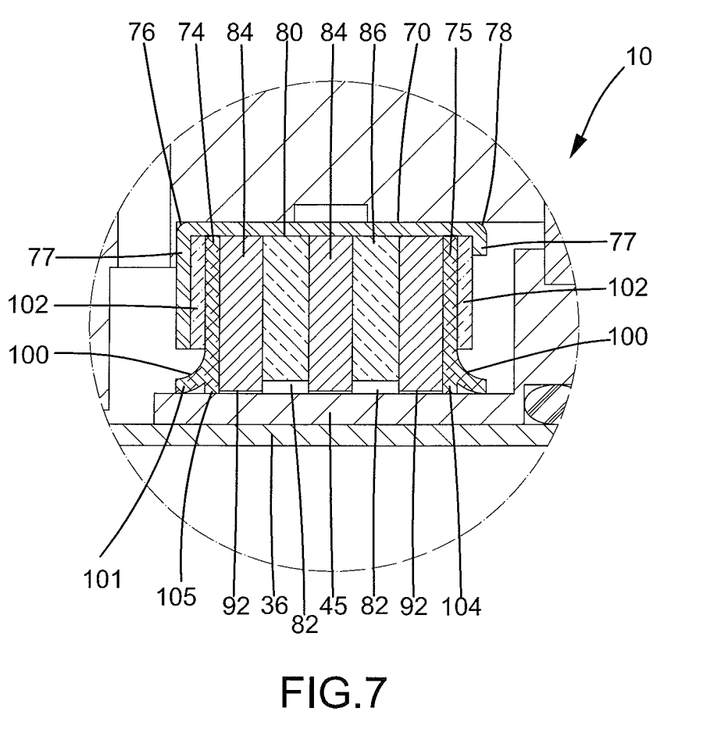
FIG. 7 is an enlarged view similar to FIG. 4, illustrating another example of seal rings of the shaft-sealing device according to the preferred teachings of the present invention.

FIG. 7 shows another example of seal rings 74 and 75 modified from those of the first embodiment. In this embodiment, each seal ring 74, 75 further includes a second lip 104 extending inwards from inner periphery 98 and at a parallel angle to the radial direction. Second lip 104 of each seal ring 74, 75 includes a distal end 105 extending away from inner periphery 98 of seal ring 74, 75 and abutting the outer periphery of collar 45, preventing the magnetic liquid in seal chamber 82 from leaking out of gap 92 between collar 45 and pole pieces 84. Namely, second lip 104 of each seal ring 74, 75 stops the magnetic liquid in seal chamber 82 from escaping from first and second ends 76 and 78 of outer ring 70 during rotation of rotary shaft 14.

Figure 8:
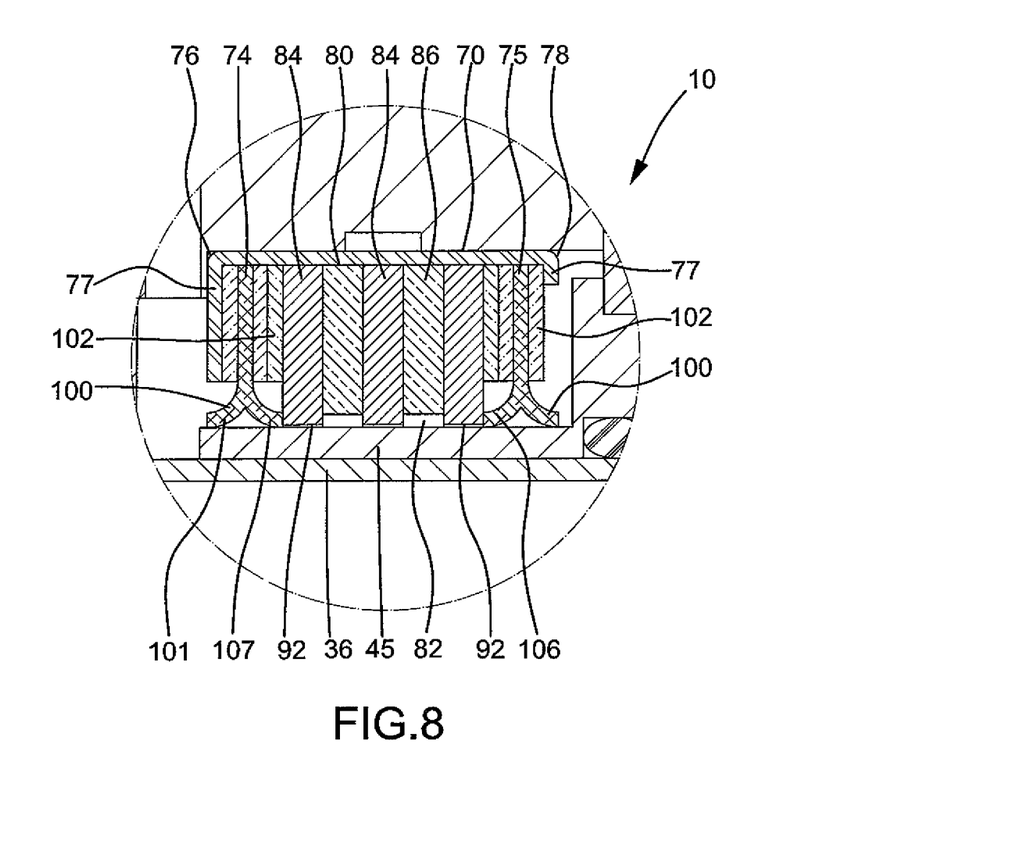
FIG. 8 is an enlarged view similar to FIG. 4, illustrating a further example of seal rings of the shaft-sealing device according to the preferred teachings of the present invention.

FIG. 8 shows a further example of seal rings 74 and 75 modified from those of the first embodiment. In this embodiment, each seal ring 74, 75 further includes a second lip 106 extending from inner periphery 98 toward magnetic-field generating unit 72 and at a non-parallel angle to the radial direction. In this embodiment, second lip 106 of each seal ring 74, 75 has arcuate cross sections. Second lip 106 of each seal ring 74, 75 includes a distal end 107 extending away from inner periphery 98 of seal ring 74, 75 and abutting the outer periphery of collar 45, preventing the magnetic liquid in seal chamber 82 from leaking out of gap 92 between collar 45 and pole pieces 84.

It can be appreciated that magnetic fluid shaft-sealing device 10 of the present invention can include two pole pieces 84 and one magnet 86 sandwiched between the two pole pieces 84. However, more than two magnets 86 and more than three pole pieces 84 can be utilized and arranged in an alternate manner along the axis.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims.

The invention claimed is:

1. A magnetic fluid shaft-sealing device comprising, in combination:
    an outer ring adapted to receive a rotary shaft with the outer ring including first and second ends spaced along an axis and defining an annular seal chamber, with the outer ring further including inner and outer peripheral surfaces spaced in the radial direction, and a through-hole extending from the inner peripheral surface through the outer peripheral surface;
    a magnetic-field generating unit mounted in the seal chamber of the outer ring, with the magnetic-field generating unit adapted to receive the rotary shaft, with a gap defined between the magnetic-field generating unit and the rotary shaft, with the gap adapted to be filled with a magnetic liquid, with the magnetic-field generating unit including a first magnet for creating a magnetic field providing a magnetic force to retain the magnetic liquid in the gap, with the magnetic-field generating unit further including a hole in communication with the through-hole of the outer ring, and with the magnetic liquid adapted to be filled in the gap through the hole and the through-hole;
    a first seal ring mounted in the seal chamber of the outer ring and located between the first magnet and the first end of the outer ring, with the first seal ring including inner and outer peripheries spaced in a radial direction perpendicular to the axis, with the rotary shaft adapted to extend through the first seal ring, with the first seal ring further including a first lip extending from the inner periphery of the first seal ring toward or away from the first end of the outer ring and at a non-parallel angle to the radial direction of the first seal ring to form a first seal around the rotary shaft;
    the magnetic-field generating unit further including a second magnet and three pole pieces spaced along the axis, with each of the first and second magnets between the three pole pieces mounted in the seal chamber of the outer ring, and with the hole formed in middle pole piece;
    a second seal ring mounted in the seal chamber of the outer ring and located between the first magnet and the second end of the outer ring, with the second seal ring including inner and outer peripheries spaced in the radial direction, with the rotary shaft adapted to extend through the second seal ring, and with the second seal ring further including a first lip extending from the inner periphery of the second seal ring toward the second end of the outer ring and at a non-parallel angle to the radial direction of the second seal ring to form a second seal around the rotary shaft.

2. The magnetic fluid shaft-sealing device as claimed in claim 1, with each of the first and second magnets including an inner diameter, and with each of the three pole pieces including an inner diameter smaller than the inner diameter of each of the first and second magnets.

3. The magnetic fluid shaft-sealing device as claimed in claim 1, with the magnetic-field generating unit located between the first and second seal rinks, with the first lip of each of the first and second seal rings extending away from the magnetic-field generating unit, with each of the first and second seal rings further including a second lip extending from the inner periphery of each of the first and second seal rings inwards in the radial direction.

4. The magnetic fluid shaft-sealing device as claimed in claim 1, with each of the first and second seal rings further including a second lip extending from the inner periphery of each of the first and second seal rings in a direction reverse to an extending direction of the first lip.

5. The magnetic fluid shaft-sealing device as claimed in claim 1, with the magnetic-field generating unit located between the first and second seal rings, with the first lip of each of the first and second seal rings extending away from the magnetic-field generating unit, with each of the first and second seal rings further including a second lip extending from the inner periphery of each of the first and second seal rings inwards in the radial direction, with a collar adapted to be mounted around the rotary shaft, with each of the first and second lips of each of the first and second seal rings having a distal end, with the distal end of each of the first and second lips of each of the first and second seal rings adapted to abut an outer periphery of the collar.

6. The magnetic fluid shaft-seating device as claimed in claim 1, with each of the first and second seal rings further including a second lip extending from the inner periphery of each of the first and second seal rings in a direction reverse to an extending direction of the first lip.

* * * * *